United States Patent [19]
Thomas

[11] Patent Number: 5,805,393
[45] Date of Patent: Sep. 8, 1998

[54] OVERCURRENT PROTECTION CIRCUIT WITH IMPROVED PTC TRIP ENDURANCE

[75] Inventor: Brian Thomas, San Francisco, Calif.

[73] Assignee: Raychem Corporation, Menlo Park, Calif.

[21] Appl. No.: 921,393

[22] Filed: Aug. 29, 1997

[51] Int. Cl.⁶ ...................................................... H02H 3/00
[52] U.S. Cl. ..................... 361/6; 361/8; 361/13
[58] Field of Search .............................. 361/6, 8, 13, 58, 361/92–93, 98–99, 106, 187

[56] References Cited

U.S. PATENT DOCUMENTS

| | | | |
|---|---|---|---|
| 4,583,146 | 4/1986 | Howell | 361/13 |
| 4,967,176 | 10/1990 | Horsma et al. | 338/22 R |
| 5,666,254 | 9/1997 | Thomas et al. | 361/8 |

*Primary Examiner*—Jeffrey A. Gaffin
*Assistant Examiner*—Michael J. Sherry
*Attorney, Agent, or Firm*—Timothy H. P. Richardson; Herbert G. Burkard

[57] ABSTRACT

An overcurrent protection system which will give a rapid response to overcurrents which cause a reduction in the voltage across the load, e.g. a partial or complete short across the load, and which will preserve the trip endurance of a PTC device used in the protection system. The new system maintains the trip endurance of the PTC device by removing the source voltage from the PTC, while still keeping the circuit protection arrangement in a fault state, thereby continuing to protect the load.

7 Claims, 2 Drawing Sheets

OVERCURRENT PROTECTION CIRCUIT WITH IMPROVED PTC TRIP ENDURANCE

RELATED APPLICATIONS

This application is related to U.S. Pat. No. 5,666,254 which is incorporated herein by reference for all purposes.

BACKGROUND OF THE INVENTION

1. Field of the Invention

This invention relates to electrical circuit overcurrent protection.

2. Introduction to the Invention

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

A limitation on the known uses of PTC protection devices is that if the overcurrent is relatively small, e.g. up to a few times the normal circuit current, it can take a relatively long time to convert the PTC device into its tripped state. U.S. Pat. No. 5,666,254 discloses a new overcurrent protection system which will give a rapid response to overcurrents which cause a reduction in the voltage across the load, e.g. a partial or complete short across the load, and is particularly suitable for protecting circuits when such a fault results in relatively small overcurrents. In the new system, a control element is placed in parallel with the load. When the voltage across the load drops, so also does the voltage across the control element. The control element is functionally linked to a circuit interruption element which is in series with the load, so that, when the voltage across the control element drops, the circuit interruption element is changed from a relatively conductive state to a relatively non-conductive state (including a completely open state). The system also includes a bypass element which is in parallel with the circuit interruption element. The bypass element is required so that, when the circuit is just switched on, current can pass through to the circuit and energize the control element, which then converts the circuit interruption element to the relatively conductive state. The bypass element must, however, be such that if a fault converts the circuit interruption element to the relatively non-conductive state, the resultant current through the bypass element changes the bypass element to a high impedance so that the voltage across the control element remains low enough to maintain the circuit interruption element in the relatively non-conductive state.

In a preferred embodiment of the invention disclosed in U.S. Pat. No. 5,666,254 the circuit interruption element is a set of relay contacts which are normally open, and the control element is a relay coil which, when energized, closes the relay contacts, and which, when deenergized, allows the contacts to open; and, the bypass element is a PTC device, preferably a polymeric PTC device. During normal circuit operation, the relay coil is energized, thereby closing the contacts. In case of an undervoltage, the relay coil deenergizes, opening the contacts. Current is diverted to the PTC device which trips to its high resistance state. The combination of the PTC device and the mechanical contacts permits the use of contacts which are rated to interrupt the overcurrent, but at a voltage substantially less than the normal circuit voltage. The combination also permits the use of a PTC device which is rated to trip at a current level which is substantially less than the normal circuit current.

However, when the relay contacts are open, and the PTC device is in its high resistance state, the PTC device must withstand the source voltage until the relay is reset, e.g., by recycling power. In some circuit applications, this could affect the trip endurance of the PTC, i.e. the stability of the device over time when powered into a high resistance, high temperature state. Therefore, there is a need to provide a means to remove the source voltage from the PTC, while still keeping the circuit protection arrangement in a fault state, thereby continuing to protect the load.

SUMMARY OF THE INVENTION

I have discovered a new overcurrent protection system which will give a rapid response to overcurrents which cause a reduction in the voltage across the load, e.g. a partial or complete short across the load, and which will preserve the trip endurance of a PTC device used in the protection system. The new system maintains the trip endurance of the PTC device by is removing the source voltage from the PTC, while still keeping the circuit protection arrangement in a fault state, thereby continuing to protect the load.

In the new system, a control element is placed in parallel with the load. When the voltage across the load drops, so also does the voltage across the control element. The control element is functionally linked to a circuit interruption element which is coupled in parallel with a bypass element, with the parallel combination coupled in series with the parallel combination of the control element and the load. When the voltage across the control element drops, the circuit interruption element is changed from a relatively conductive state to a relatively non-conductive state (including a completely open state).

The bypass element has two parallel paths. When the circuit interruption element changes to a relatively non-conductive state, current is diverted to the bypass element, with substantially all of the current flowing through a first bypass path. A PTC device coupled in the first bypass path is initially in a low impedance state. In response to the diversion of current through the first bypass path, the PTC device increases in resistance, thereby diverting current through a second bypass path. A bypass sensor, e.g. a relay coil or a voltage divider, in the second bypass path, senses the voltage level across the bypass element. When the voltage across the bypass element reaches a predetermined level, the bypass sensor causes a bypass switch, e.g. relay contacts or an FET, coupled in series with the PTC device, to switch from a closed or on state to an open or off state. The impedance of the bypass sensor is high enough so that as long as power continues to be applied, a very low current continues to flow through the bypass sensor, thereby keeping the bypass switch in the off or open state, but allowing very little current to flow through the load. This also keeps current through the PTC device very low (or zero) and applies the source voltage across the bypass sensor and bypass switch, thereby allowing the PTC device to return to its low impedance state. The bypass element, is arranged such that if a fault converts the circuit interruption element to the relatively non-conductive state, the resultant current through the bypass element changes the bypass element so that the voltage across the control element remains low enough to maintain the circuit interruption element in the relatively non-conductive state.

The bypass element serves the additional function that when the circuit is just switched on, current can pass through to the circuit and energize the control element, which then converts the circuit interruption element to the relatively conductive state.

In a preferred aspect, this invention provides an electrical system which can be connected between an electrical power supply and an electrical load to form an operating circuit, and which when so connected protects the circuit from overcurrents, which system comprises:

a. a control element which, in the operating circuit, is connected in parallel with the load; and b. a circuit interruption element and a bypass element which, in the operating circuit, are coupled in parallel, the parallel combination coupled in series between the electrical power supply and the parallel combination of the electrical load and the control element;

wherein i. the circuit interruption element has
  (1) a closed state which permits the flow of a normal current, $I_{NORMAL}$, through the circuit interruption element, and
  (2) an open state which permits the flow of at most a reduced current, substantially less than $I_{NORMAL}$, through the circuit interruption element;

ii. the control element has
  (1) an on state, when the voltage across the control element is a normal voltage, $V_{NORMAL}$, and
  (2) an off state, when the voltage across the control element falls to a value $V_{FAULT}$, or less, and is functionally linked to the circuit interruption element so that when the control element is in the on state, the circuit interruption element is in the closed state, and when the control element is in the off state, the circuit interruption element is in the open state; and iii. the bypass element comprises a parallel combination of a first bypass path and a second bypass path, and has
  (1) a start-up state such that, if the circuit interruption element is in the open state and a current $I_{NORMAL}$ is passed through the bypass element, substantially all the current through the bypass element passes through the first bypass path, and the voltage across the control element is greater than $V_{FAULT}$, and
  (2) a stopped state such that if the circuit interruption element is in the open state as a result of the voltage across the control element having fallen to a value $V_{FAULT}$ or less, substantially all the current through the bypass element passes through the second bypass path, and the current through the bypass element is such that the voltage across the control element remains at a value of $V_{FAULT}$ or less.

In a preferred embodiment of the invention, the circuit interruption element is a first set of relay contacts which are normally open, and the control element is a first relay coil which, when energized, closes the first set of relay contacts, and which, when deenergized, allows the first set of relay contacts to open. The first bypass path is a series combination of a PTC device and a second set of relay contacts which are normally closed, and the second bypass path is a second relay coil which, when energized, opens the second set of relay contacts, and when deenergized, allows the second set of relay contacts to close. In case of an overcurrent resulting in a voltage drop across the first relay coil, the first relay coil deenergizes allowing the first set of relay contacts to open, thereby diverting current to the parallel combination of the first and second bypass paths. In the low impedance state, the impedance of the PTC device is substantially smaller than that of the second relay coil. Therefore, substantially all of the diverted current passes through the first bypass path, including the PTC device. In response to the increased current, the PTC device heats up and increases its impedance, thereby diverting current to the second bypass path, i.e. the second relay coil. The second relay coil energizes, thereby opening the second set of contacts, thereby stopping the flow of current through the PTC device which cools and returns to its low impedance state. As long as power is applied, and the cause of the overcurrent condition remains, a small amount of current continues to flow through the second relay coil, thereby keeping the second relay coil energized and the second set of contacts open. Substantially all of the applied source voltage appears across the second relay coil and the second set of relay contacts, and there is very little or no voltage across the PTC device.

In another preferred embodiment, both relay coils are replaced by voltage dividers and both sets of relay contacts are replaced by FETs. The outputs of the voltage dividers are coupled to the gates of the respective FETs. The operation of the protection system is essentially the same as described above, with the primary difference being in that in the OFF state, both FETs may allow a very small leakage current to flow.

Both of the preferred embodiments provide a rapid response to overcurrents which cause a reduction in the voltage across the load. Both embodiments maintain the trip endurance of the PTC device by removing the source voltage from the PTC, while still keeping the circuit protection arrangement in a fault state, thereby continuing to protect the load. The solid state arrangement has an advantage over the relay arrangement in that the voltage dividers can be selected to present a much higher impedance than that of the relay coils, thereby consuming much less power than that consumed by the relay coils. The solid state arrangement has the additional potential advantages of longer life, lower cost and smaller size.

BRIEF DESCRIPTION OF THE DRAWINGS

The invention is illustrated in the accompanying drawings, in which like components are given the same reference numerals in each FIG. in which they appear, and in which.

DETAILED DESCRIPTION OF THE INVENTION

Figure 1:
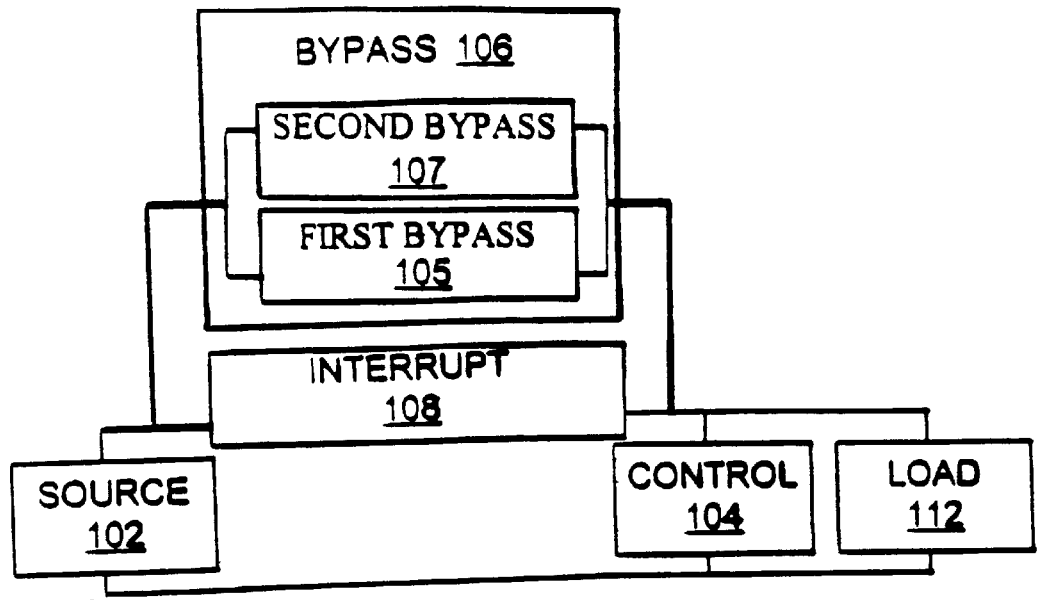
FIG. 1 is a modified FIG. 1 from U.S. Pat. No. 5,666,254, and shows a block diagram depicting general overcurrent protection functions performed by electrical components in overcurrent protection circuits including the circuits of this invention. The figure has been modified to show two bypass paths through the bypass element.

FIG. 1 is a modified FIG. 1 from U.S. Pat. No. 5,666,254, and shows a block diagram depicting general overcurrent protection functions performed by electrical components in overcurrent protection circuits including the circuits of this invention. The figure has been modified to show two bypass paths 105, 107 through a bypass element 106. Five operational elements depicted in FIG. 1 are a source 102, a control element 104, the bypass element 106, an interrupt element 108 and a load 112. The source 102 provides the electrical power to the circuit, and the load 112 performs the intended purpose of the circuit. The control 104, interrupt 108, and bypass 106 elements work cooperatively to provide overcurrent protection.

Figure 2:
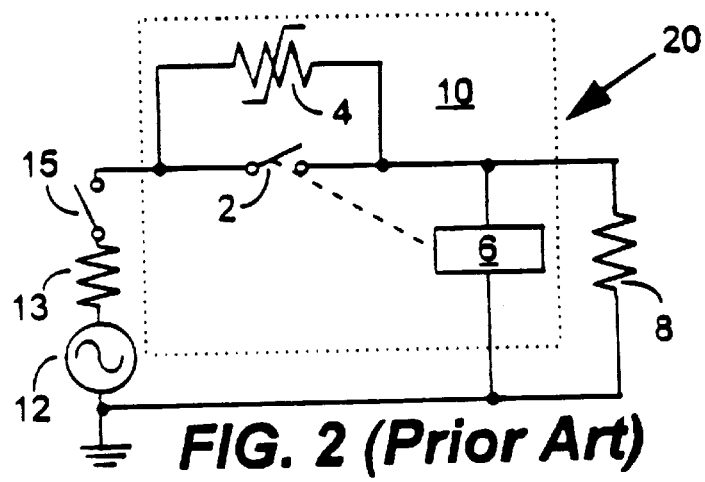
FIG. 2 is the same as FIG. 2 in U.S. Pat. No. 5,666,254, and shows a circuit diagram of an embodiment of the invention disclosed in that application.

FIG. 2 is the same as FIG. 2 in U.S. Pat. No. 5,666,254, and shows a circuit diagram of an embodiment of the invention disclosed in that application. FIG. 2 shows an electrical circuit 20, comprising a power source 12, a source impedance 13, a switch 15, a load 8, and an overcurrent protection system 10. The overcurrent protection system 10 comprises a normally open first set of relay contacts 2, a PTC device 4 connected in parallel with the relay contacts, and a voltage-sensing first relay coil 6 connected in parallel across the load 8. In normal operation, when the power source 12 is connected by closing the switch 15, the first set of relay contacts 2 are initially open, but the first relay coil 6 becomes energized via current flowing through the PTC device 4, thereby closing the first set of relay contacts 2. With the first set of relay contacts 2 closed, the PTC device 4 does not carry the normal circuit current. If a fault develops in the load 8, the current in the circuit 20 increases, and the voltage across the load 8 and the first relay coil 6 is reduced, thereby deenergizing the first relay coil 6, and opening the first set of relay contacts 2. The overcurrent then flows through the PTC device 4 which then trips to its high resistance state and reduces the current to a safe level.

In the circuit of FIG. 2, the first relay coil 6 functions as the control element 104 (FIG. 1), the first set of relay contacts 2 function as the interrupt element 108, and the PTC device 4 functions as the bypass element 102 of FIG. 1 of U.S. Pat. No. 5,666,254.

The presence of the PTC device 4 in parallel with the first set of relay contacts 2 permits the use of a first set of relay contacts 2 which are rated to carry the normal circuit current, and to interrupt the maximum overcurrent at a voltage which is less than the normal applied voltage. With the PTC device 4 having a low resistance state resistance of $R_{PTC\ LOW}$, and the circuit 20 having a maximum overcurrent with the load 8 shorted of $I_{MAX\ OVERCURRENT}$, then the first set of relay contacts 2 are rated to interrupt $I_{MAX\ OVERCURRENT}$ at a voltage less than $R_{PTC\ LOW} \times I_{MAX\ OVERCURRENT}$.

Figure 3:
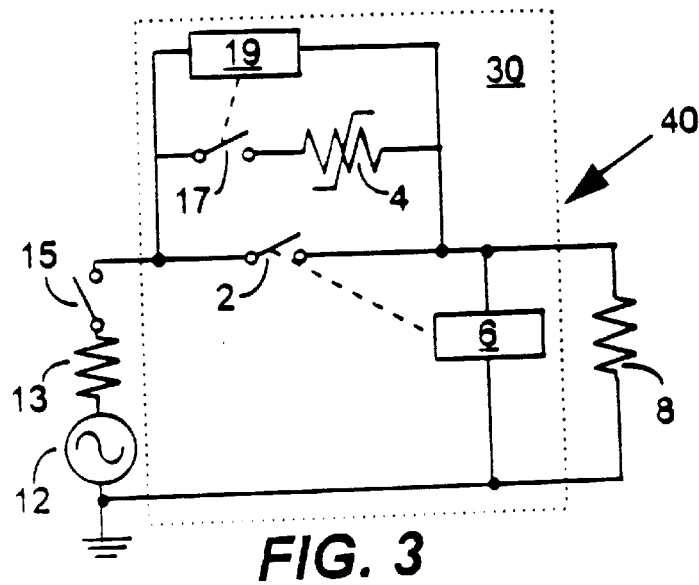
FIG. 3 is an embodiment of a circuit protection arrangement of this invention employing relay coils and relay contacts.

FIG. 3 shows an embodiment of a circuit protection arrangement of the present invention. FIG. 3 shows an electrical circuit 40 which is similar to the electrical circuit 20 shown in FIG. 2. The protection system 30 in FIG. 3 differs from the protection system 10 in FIG. 2 in that the bypass element 106 (FIG. 1) comprises two paths instead of a single path. A first bypass path 105 (FIG. 1) comprises a PTC device 4 coupled in series with a second set of relay contacts 17, and a second bypass path 107 (FIG. 1.) comprises a voltage-sensing second relay coil 19 coupled with the second set of relay contacts 17.

In normal operation, when the power source 12 is connected by closing the switch 15, the first set of relay contacts 2 are initially open and the second set of relay contacts 17 are initially closed. The first relay coil 6 becomes energized via current flowing through the second set of relay contacts 17 and the PTC device 4 (i.e., the first bypass path 105 (FIG. 1)), thereby closing the first set of relay contacts 2. With the first set of relay contacts 2 closed, substantially all the circuit current flows through the first set of relay contacts 2. If a fault develops at the load 8, the current in the circuit 40 increases, and the voltage across the load 8 and the first relay coil 6 is reduced, thereby deenergizing the first relay coil 6, and opening the first set of relay contacts 2. The overcurrent then flows through the second set of relay contacts 17 and PTC device 4. The PTC device 4 trips to its high resistance state thereby diverting the current to the second relay coil 19 in the second bypass path 107 (FIG. 1). The second relay coil 19 energizes and opens the second set of relay contacts 17 thereby opening the first bypass path 105 (FIG. 1) and removing current from the PTC device 4. The impedance of the second relay coil 19 is sufficiently high to keep the current in the circuit 40 sufficiently low to protect the load 8 and still keep the first relay coil 6 deenergized.

Figure 4:
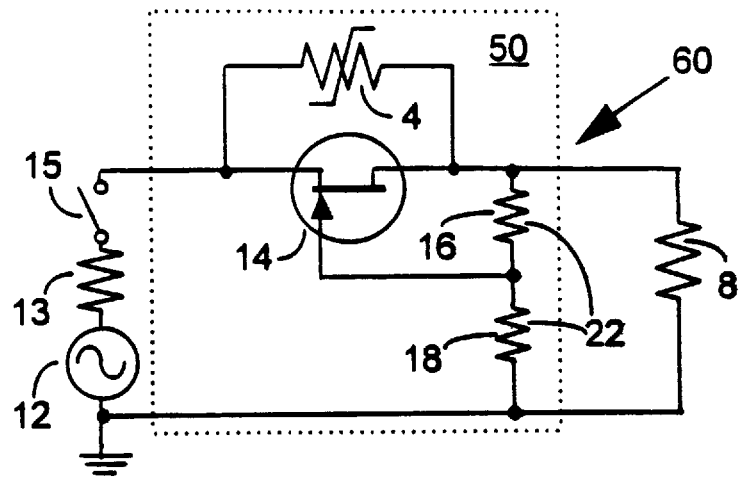
FIG. 4 is the same as FIG. 4 in U.S. Pat. No. 5,666,254, and shows a circuit diagram of an embodiment of the invention disclosed in that application.

In the overcurrent protection arrangements 10, 30 shown in FIGS. 2 and 3, the first relay coil 6 is energized continuously during normal operation, and therefore continuously draws power from the power source 12. A solid state alternative to the circuit of FIG. 2 is shown in the circuit 60 of FIG. 4. This is the circuit shown in FIG. 5 of U.S. Pat. No. 5,666,254, and shows a circuit diagram of an embodiment of the invention disclosed in that application. Instead of a relay coil 6 and relay contacts 2, the solid state system 50 comprises a solid state switch, such as a first field effect transistor (FET) 14, connected in the line of the circuit 60, with the gate of the first FET 14 connected to a first voltage divider 22. The first voltage divider 22 comprises series connected resistors 16, 18 connected in parallel with the load 8 and coupled with the gate of the first FET 14. The solid state arrangement 30 functions in essentially the same manner as does the overcurrent protection arrangement 20 of FIG. 2. At turn on, the first FET 14 is initially off until a voltage appears across the load 8 and first voltage divider 22 by way of current flowing through the PTC device 4. The voltage appearing at the gate of the first FET 14 turns the first FET 14 on, thereby allowing current to flow in the circuit 60. If there is a short or other fault at the load 8, the resulting undervoltage across the voltage divider 22 causes the first FET 14 to turn off. The current is then diverted to the PTC device 4 which trips to its high resistance state. The combination of the first FET 14 and PTC device 4 reduces the switching energy of the first FET 14 and can allow the use of a smaller FET.

Figure 5:
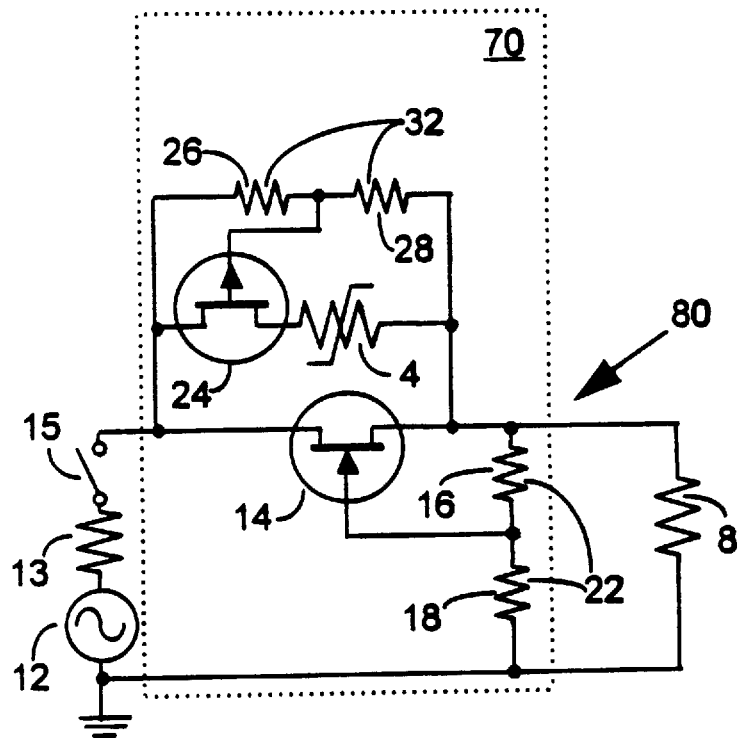
FIG. 5 is an embodiment of a circuit protection arrangement of this invention employing voltage dividers and FETs.

FIG. 5 shows a second embodiment of a circuit protection arrangement of the present invention. FIG. 5 shows an electrical circuit 80 which comprises first and second bypass paths 105, 107 (FIG. 1) similar to the protection system 30 in the circuit 40 shown in FIG. 3, but employs solid state devices, e.g. FETs, similar to the protection system 50 in the circuit 60 shown in FIG. 2. In the protection system 70 in FIG. 5, a first bypass path 105 (FIG. 1) comprises a PTC device 4 coupled in series with a second FET 24, and a second bypass path 107 (FIG. 1.) comprises a second voltage divider 32 comprising series coupled resistors 26, 28 connected in parallel with the series combination of the second FET 24 and PTC device 4. The second voltage divider 32 is coupled with the gate of the second FET 24. The second FET 24 may be a p-channel junction FET (JFET) or other such device which is in a normally on state.

In normal operation, when the power source 12 is connected by closing the switch 15, the first FET 14 is initially off and the second FET 24 is initially on. The first voltage divider 22 becomes energized via current flowing through the second FET 24 and the PTC device 4 (i.e., the first bypass path 105 (FIG. 1)). The voltage at the gate of the first FET 14 goes sufficiently positive to turn the first FET 14 on. With the first FET 14 on, substantially all the circuit current flows through the first FET 14. If a fault develops in the load 8, the current in the circuit 80 increases, and the voltage across the load 8 and the first voltage divider 22 is reduced, thereby turning off the first FET 14. The overcurrent then flows through the second FET 24 and PTC device 4. The PTC device 4 trips to its high resistance state thereby diverting the current to the second voltage divider 32 in the second bypass path 107 (FIG. 1). The increased voltage across the second voltage divider 32 raises the voltage at the gate of the second FET 24, and turns off the second FET 24. The current in the first bypass path 105 (FIG. 1), including the PTC device 4, is further reduced to the off state leakage current of the second FET 14. The impedance of the second voltage divider 32 is sufficiently high to keep the current in the circuit 70 sufficiently low to protect the load 8 and thereby keep the first FET 14 turned off.

In the solid state protection system 70 shown in FIG. 5, other arrangements may be used in place of the first and second voltage dividers 22, 32. For example, arrangements comprising zener diodes or other voltage regulating or clamping devices may be used.

The solid state overcurrent protection system 70 has an advantage over the relay overcurrent protection system 30 in that the values of the resistors 16, 18 comprising the first voltage divider 22 can be selected to present a much higher impedance than that of the first relay coil 6, thereby consuming much less power during normal operation than that consumed by the arrangement which includes the first relay coil 6. The solid state arrangement 70 has the additional potential advantages of longer life, lower cost and smaller size. Other solid state switching devices such as bipolar transistors, triacs, and silicon controlled rectifiers may be used in place of the FETs. Hybrid combinations, e.g. a solid state arrangement used for the control 104 and interrupt 108 elements, with a relay arrangement used in the bypass element 106, or the converse, e.g. a relay arrangement used for the control 104 and interrupt 108 elements, with a solid state arrangement used in the bypass element 106, may also be used.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, at that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

I claim:

1. An electrical system which can be connected between an electrical power supply and an electrical load to form an operating circuit, and which when so connected protects the circuit from overcurrents, which system comprises:

a. a control element which, in the operating circuit, is connected in parallel with the load; and
   b. a circuit interruption element and a bypass element which, in the operating circuit, are coupled in parallel, the parallel combination coupled in series between the electrical power supply and the parallel combination of the electrical load and the control element;

wherein i. the circuit interruption element has
      (1) a closed state which permits the flow of a normal current, $I_{NORMAL}$, through the circuit interruption element, and
      (2) an open state which permits the flow of at most a reduced current, substantially less than $I_{NORMAL}$, through the circuit interruption element;
   ii. the control element has
      (1) an on state, when the voltage across the control element is a normal voltage, $V_{NORMAL}$,
      (2) an off state, when the voltage across the control element falls to a value $V_{FAULT}$, or less, and
      is functionally linked to the circuit interruption element so that when the control element is in the on state, the circuit interruption element is in the closed state, and when the control element is in the off state, the circuit interruption element is in the open state; and
   iii. the bypass element, comprises a parallel combination of a first bypass path and a second bypass path, and has
      (1) a start-up state such that, if the circuit interruption element is in the open state and a current $I_{NORMAL}$ is passed through the bypass element, substantially all the current through the bypass element passes through the first bypass path, and the voltage across the control element is greater than $V_{FAULT}$, and
      (2) a stopped state such that if the circuit interruption element is in the open state as a result of the voltage across the control element having fallen to a value $V_{FAULT}$ or less, substantially all the current through the bypass element passes through the second bypass path, and the current through the bypass element is such that the voltage across the control element remains at a value of $V_{FAULT}$ or less.

2. A system according to claim 1, wherein:
   a. the control element comprises a first relay coil, which
      (1) is energized when the voltage across the first relay coil is $V_{NORMAL}$, and
      (2) is deenergized, when the voltage across the first relay coil falls to a value $V_{FAULT}$ or less; and
   b. the circuit interruption element comprises a first set of relay contacts which are coupled with the first relay coil, and which
      (1) are closed when the first relay coil is energized, and
      (2) are open when the first relay coil is deenergized.

3. A system according to claim 1, wherein:
   a. the first bypass path comprises a series combination of a PTC device and a second set of relay contacts; and
   b. the second bypass path comprises a second relay coil which is coupled with the second set of relay contacts;

wherein
  i. when the bypass element is in the start-up state, the second relay coil is deenergized and the second set of relay contacts are closed, and
  ii. when the bypass element is in the stopped state, the second relay coil is energized and the second set of relay contacts are open.

4. A system according to claim 3 wherein the PTC device is a polymeric PTC device.

5. A system according to claim 1, wherein:
  a. the circuit interruption element comprises a first field effect transistor (FET), comprising a gate, a source, and a drain, which
     (1) will allow the normal circuit current, $I_{NORMAL}$, to pass when the gate voltage of the first FET is a normal gate voltage, and
     (2) will switch to permit the flow of at most a reduced current, substantially less than $I_{NORMAL}$, when the gate voltage of the first FET falls below the normal gate voltage by a predetermined gate voltage amount; and
  b. the control element comprises a voltage divider which determines the gate voltage of the FET.

6. A system according to claim 1, wherein:
  a. the first bypass path comprises a series combination of a PTC device and a second FET; and
  b. the second bypass path comprises a second voltage divider which determines the gate voltage of the second;
wherein
  i. when the bypass element is in the start-up state, the voltage across the second voltage divider is less than a predetermined bypass voltage amount, and the second FET is in an ON state; and
  ii. when the bypass element is in the stopped state, the voltage across the second voltage divider is above the predetermined bypass voltage amount, and the second FET is in an OFF state, in which it will pass at most a reduced current.

7. An electrical circuit, comprising an electrical power supply, an electrical load, and an electrical protection system which protects the electrical circuit from overcurrents, which system comprises:

a. a control element which is connected in parallel with the load;
  b. a circuit interruption element and a bypass element which are coupled in parallel, the parallel combination coupled in series between the electrical power supply and the parallel combination of the electrical load and the control element;
wherein
  i. the circuit interruption element has
     (1) a closed state which permits the flow of a normal current, $I_{NORMAL}$, through the circuit interruption element, and
     (2) an open state which permits the flow of at most a reduced current, substantially less than $I_{NORMAL}$, through the circuit interruption element;
  ii. the control element has
     (1) (i) an on state, when the voltage across the control element is a normal voltage, $V_{NORMAL}$, and
         (ii) is converted to an off state, when the voltage across the control element falls to a value $V_{FAULT}$, or less, and
     (2) is functionally linked to the circuit interruption element so that when the control element is in the on state, the circuit interruption element is in the closed state, and when the control element is in the off state, the circuit interruption element is in the open state; and
  iii. the bypass element, comprises a parallel combination of a first bypass path and a second bypass path, and has
     (1) a start-up state such that, if the circuit interruption element is in the open state and a current $I_{NORMAL}$ is passed through the bypass element, substantially all the current through the bypass element passes through the first bypass path, and the voltage across the control element is greater than $V_{FAULT}$, and
     (2) a stopped state such that if the circuit interruption element is in the open state as a result of the voltage across the control element having fallen to a value $V_{FAULT}$ or less, substantially all the current through the bypass element passes through the second bypass path, and the current through the bypass element is such that the voltage across the control element remains at a value of $V_{FAULT}$ or less.

* * * * *

UNITED STATES PATENT AND TRADEMARK OFFICE
CERTIFICATE OF CORRECTION

PATENT NO. : 5,805,393

INVENTOR(S) : Brian Thomas

DATED : September 8, 1998

It is certified that error appears in the above-identified patent and that said Letters Patent is hereby corrected as shown below:

Column 2, line 40, after "by" delete "is".

Claim 6, lines 5-6, after "second" insert --FET--.

Signed and Sealed this

Twenty-fourth Day of November, 1998

Attest:

Attesting Officer

BRUCE LEHMAN

Commissioner of Patents and Trademarks